Feb. 4, 1958  J. MORKOSKI  2,821,832
COTTON PICKER DRIVE INCLUDING SYNCHRONIZER
Filed Aug. 1, 1955  3 Sheets-Sheet 2

INVENTOR.
James Morkoski
BY
Paul O. Pippel
Atty

Feb. 4, 1958    J. MORKOSKI    2,821,832
COTTON PICKER DRIVE INCLUDING SYNCHRONIZER
Filed Aug. 1, 1955    3 Sheets-Sheet 3

INVENTOR.
James Morkoski
BY
Paul O. Pippel
Atty.

United States Patent Office 2,821,832
Patented Feb. 4, 1958

2,821,832

COTTON PICKER DRIVE INCLUDING SYNCHRONIZER

James Morkoski, Des Plaines, Ill., assignor to International Harvester Company, a corporation of New Jersey Application August 1, 1955, Serial No. 525,742

8 Claims. (Cl. 56—44)

This invention relates to cotton pickers and more particularly to a novel drive therefor.

In cotton pickers of current construction, a problem has arisen to provide a drive which is sensitive to chokages so as to stop the operation before the parts are broken or seriously damaged such as will incapacitate the machine. The drives presently employed utilize a positive transmission in the form of a timing chain and sprocket which is geared to rotate the cotton picker drum with a peripheral speed substantially equal to the ground traverse speed of the cotton picker so that there is no movement of translation between the picker and the plant being operated upon so as to prevent the picker from stripping green bolls and leaves off the plant. This type of drive is satisfactory where no obstruction develops which impedes or stops the rotation of the drum. However, with the improvement in the cotton plants which obtains a bush which is dense and has extremely thick stalks the positive drive of the drum is actually detrimental because the driver is incapable of anticipating a chokage or jamming prior to it occurring and the resulting damage of the machine ensues before the operator can stop the machine. This has always occurred where a foreign object lodged in the plant passage.

A principal object of the invention is to provide an impositive drive for rotating the picker drum so that if a chokage or stoppage does occur its cause will stop the drum while simultaneously the driving force which normally rotates the drum is diverted to driving the spindles at an accelerated rate, the driving force thus being expended without damaging the parts.

A more specific object of the invention is to provide a novel planetary type of drive for rotating the picker drum in toto and also rotating the spindles, the drum being associated with a timing or synchronizing device which merely acts to limit the speed at which the planetary system rotates the drum but that in no way supplements or imposes a driving load on the drum.

These and other objects of the invention become more apparent from the specification and the drawings, wherein.

Figure 1:
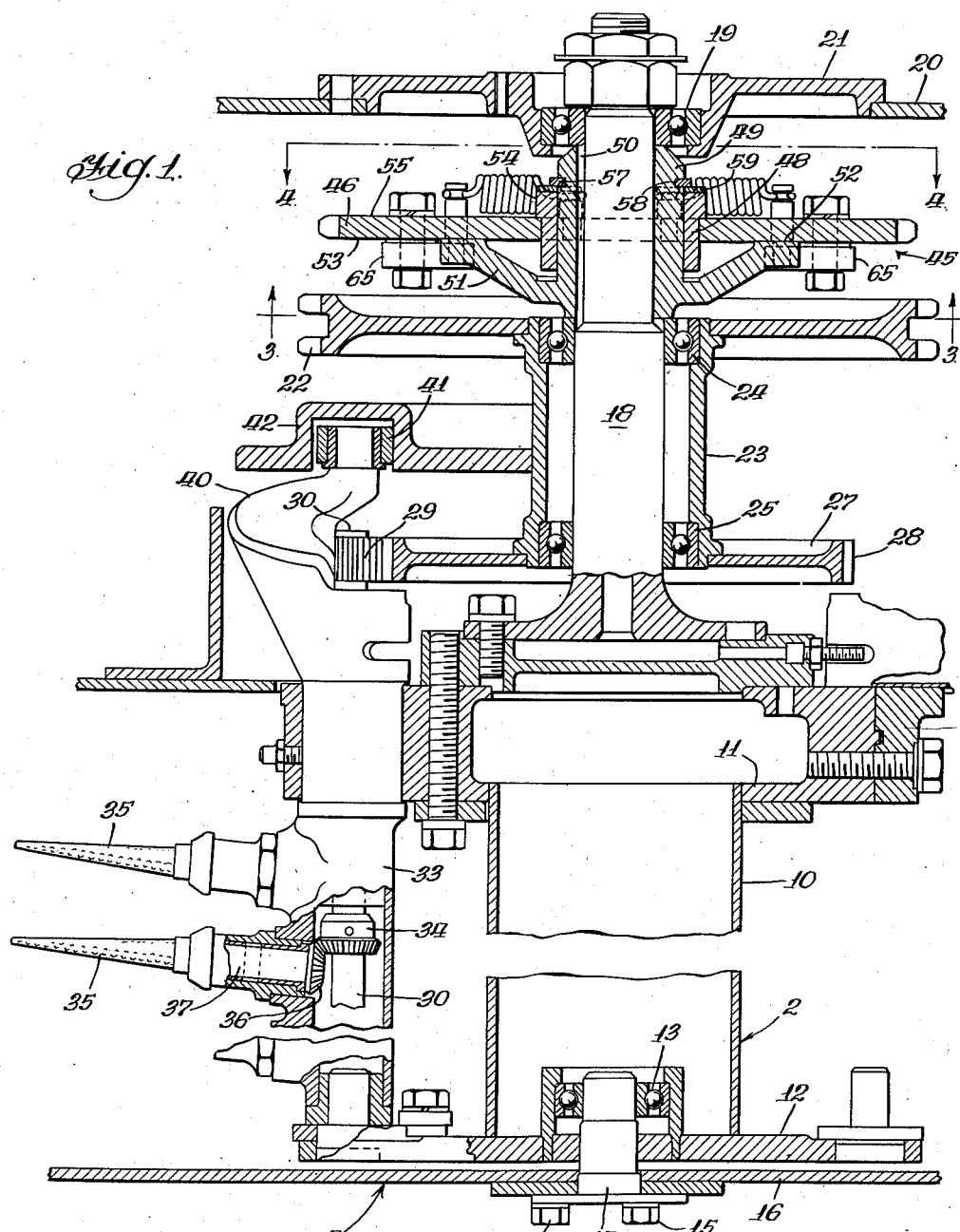
Figure 1 is a vertical broken apart sectional view of a cotton picker drum incorporating the invention.

Describing the invention in detail the cotton picker drums or rotors generally designated 2 and 3 (Fig. 2) are of substantially identical construction and therefore only one unit will be described in detail.

The units 2 and 3 are carried within a housing 4 as shown in U. S. Patent 2,140,631 and are disposed at opposite sides of a fore and aft extending longitudinal plant passage 6, Figure 2, in the housing. The units 2 and 3 orbit in the direction of the arrows and on their sides 8 adjacent to the passage moving from front to rear as respect to the passage 6.

As best seen in Figure 1 the drum 2 comprises a center support in the form of a tube 10 which at its upper and lower ends is connected to end members 11 and 12, the member 12 being journalled by a bearing 13 on an upstanding spindle support structure 14 which is suitably mounted by means of nut and bolt assemblies 15 to the bottom wall 16 of the housing structure 4. The upper end member 11 is connected to an upright shaft 18 coaxial with the spindle 14 and the upper end of the spindle 18 is supported through a bearing assembly 19 upon the upper wall 20 of the housing by a cap 21 which mounts the bearing assembly 19. The drum or rotor 2 is thus rotatable on the vertical axis and has its area adjacent to the picker passage 6 rotating from front to rear.

Figure 2:
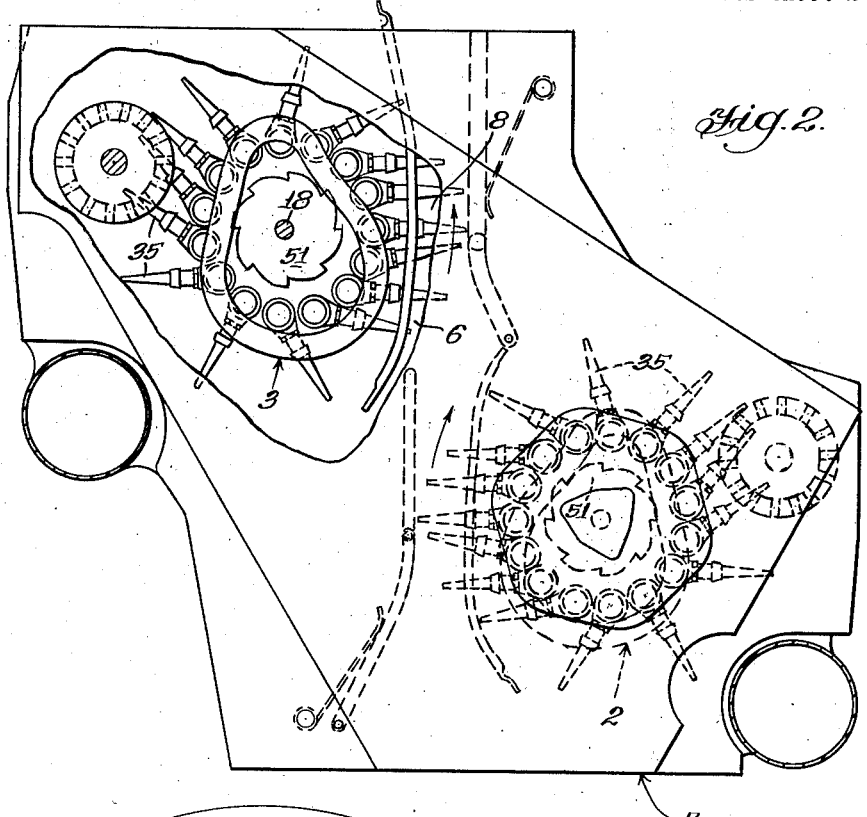
Figure 2 is a plan view of a cotton picker unit with parts broken away and in horizontal section and showing the invention applied thereto, the view being on a different scale than Figure 1.
Figure 3:
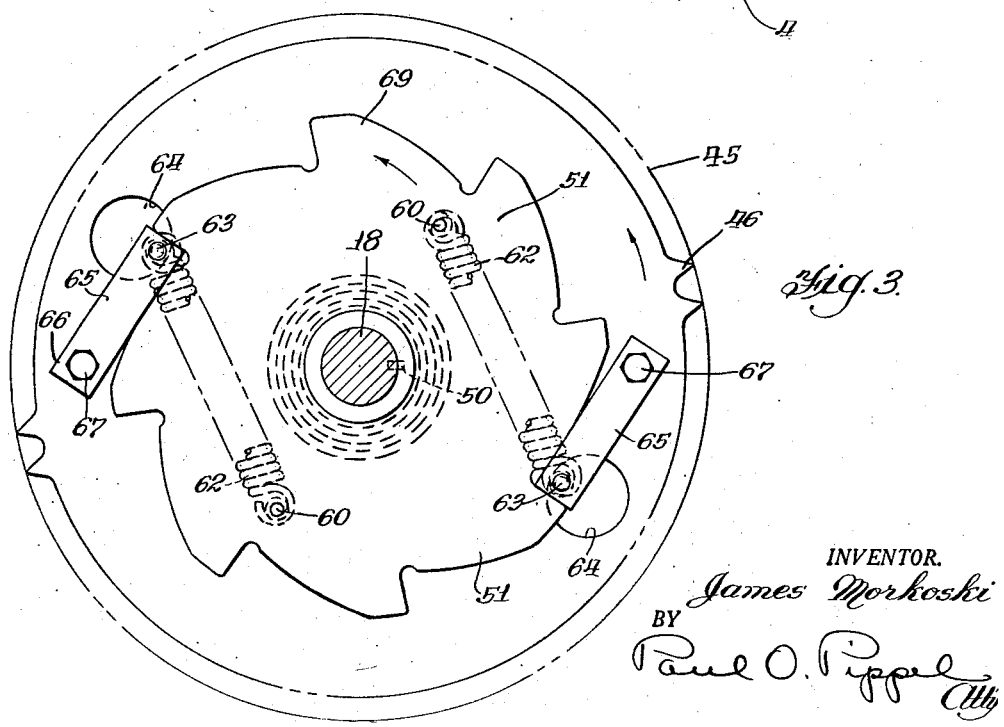
Figure 3 is a sectional view taken substantially on the line 3—3 of Figure 1.
Figure 4:
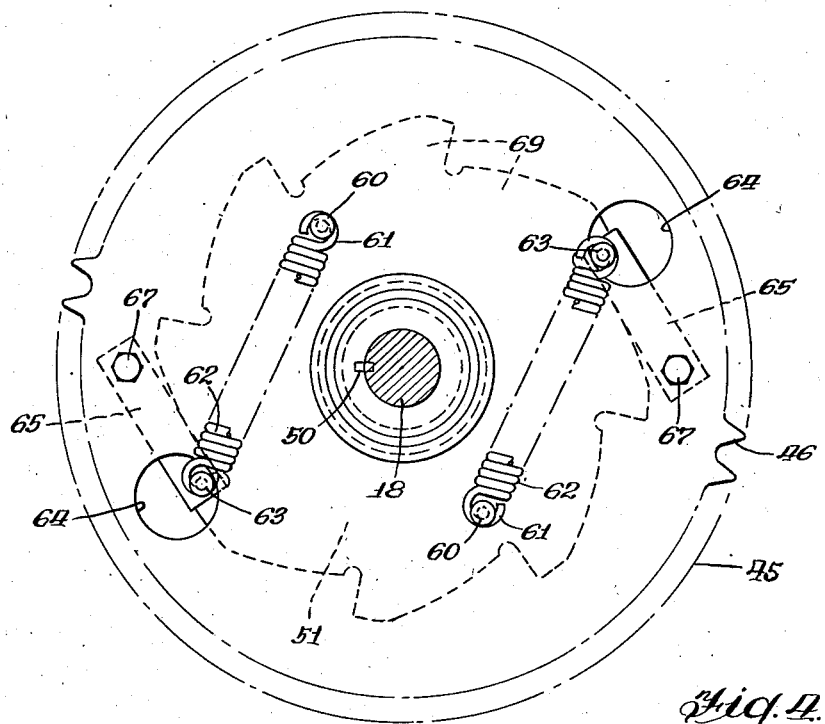
Figure 4 is a sectional view taken substantially on line 4—4 of Figure 1.

The rotation of the drum in such direction is accomplished by a chain drive to the input sprocket 22 substantially as shown and explained in the above identified patent, and said input sprocket 22 being connected to the upper end of a sleeve 23 which surrounds and is coaxial with the shaft 18 and rotatably mounted upon and spaced therefrom by upper and lower bearings 24 and 25. It will be seen that sprocket 22 is at the upper end of the sleeve 23 and that the lower end of the sleeve 23 is connected to a master or sun gear 27 which is toothed about its outer periphery as at 28 and meshes with a plurality of pinions or planet 29 each of which is carried and connected to the upper end of a driving shaft 30 which extends through and is supported within an associated vertical spindle carrying bar 33. Shaft 30 drives and is connected to a series of bevel gears 34 which are spaced vertically on the order of the spacing of the spindles 35. Each bevel gear 34 meshes with a companion bevel gear 36 on the inner end of the associated spindle 35 and the said spindle 35 being suitably journalled as at 37 for rotation about its individual axis and extending radially outwardly of the related bar 33 substantially as shown in the aforesaid patent. Each bar 33 has a cam arm 40 at its upper end with a cam roller 41 which cooperates with a cam 42 in the usual manner for positioning the spindles as shown in Figure 2 and as explained in the aforesaid mentioned patent.

The crux of the instant invention lies in the driving not only the spindles 35 but the entire rotor assembly or picker unit 2 in the directions indicated solely by means of the rotation of the master gear 27. This is accomplished by the friction created in the meshing of the gears 34 and 36 and the friction developed between the spindles 35 and their journals at 37 and at the journals 37' for the shafts 30 from the bars 33 so that as the master gear 27 spins about the axis of the shaft 18 it not only drives the planet gears 29 on their individual vertical axes, but also drives the entire assembly 2 so that it rotates about the axis of the shaft 18. It will be realized, that upon the rotor or drum 2 encountering an obstruction by the spindles 35 being blocked or restrained from sweeping rearwardly as when an unusually large bush or some foreign obstacle is entered into the plant passage, the master gear 27 can still rotate, however, the entire drum assembly will stop and the driving force which is normally partially expended in bodily rotating the drum 2 will then have that portion of the drive diverted to driving the planets 29 faster than usual about their individual axes and therefore driving the spindles 35 at a faster rate than previously. Thus the drive continues but is channeled to points where it is not destructive.

I have found from actual tests that approximately 60 foot pounds of torque at normal operating speeds is developed at the outer periphery of the picker drum and that if the drum were allowed to rotate freely without any restraint it would accelerate in speed and would tear and destroy the plants passing through the plant passage.

In order to control this rotation there is provided a synchronizer or limiter or control assembly generally designated 45 which comprises a sprocket 46 driven by a speed timed chain which is driven from a power source such as indicated in the beforementioned patent. It will be understood that the sprocket or control element 46 is driven in the same direction as the drum 2 and at such speed as to obtain substantial correspondence with the ground speed of the picking machine and is herein termed maximum speed. It will be understood that the sprocket 46 is press fitted on a sleeve 48 which is rotatably mounted on the sleeve 49, the sleeve 49 being fitted over the shaft 18 and keyed thereto as by key 50 whereby the sleeve 49 and the shaft 18 rotate as unitary structure. The sleeve 49 is clamped axially between the bearing assemblies 24 and 19 as best seen in Figure 1 and at its lower end is provided with an upwardly dished outwardly extending ratchet wheel 51, said ratchet wheel providing an upper planar face 52 against which the bottom side 53 of the sprocket 46 seats. The sprocket 46 is prevented from moving upwardly relative to the sleeve 48 by an outwardly extending shoulder 54 formed integral with the sleeve 48 and engaging with the upper side 55 of the sprocket 46 and the sleeve 48 is prevented from working upwardly relative to the sprocket 46 by means of a snap ring 57 which is snapped into a groove 58 in the external periphery of the sleeve 49 and bearing against the upper edge of the sleeve 48 through a washer 59. The top side of the sprocket wheel 46 is provided with upstanding anchor posts 60 over each of which one end 61 of a tension spring 62 is hooked and the other end of the tension spring being hooked over a post 63 which extends through an opening 64 in the sprocket wheel 46 and the lower end of said post 63 being directly connected to the adjacent end of a dog 65, said dog being pivoted on a vertical axis at its other end 66 on a bolt 67 which is mounted on the sprocket wheel 46 at a point outwardly of the periphery of the teeth 69 of the ratchet wheel. It will be seen that the springs 62 and the dogs 65 are adapted to move with the sprocket 46 in the same direction as the ratchet wheel or element 51 under normal operation it being understood that the ratchet wheel 51 is being driven from the shaft 18 which in turn is indirectly driven through the planetary system which provides an impositive driving connection and constituted by the gear 27 and the planets 29 in view of the internal friction developed in the entire gear system. It will be readily appreciated that as soon as chokage occurs which stops the rotation of the drum the speed limiting device or the synchronizer 45, that is the sprocket 46, is driven in the beforementioned direction of normal operation of the drum while the dogs 65 provide an escapement over the teeth 69 without in any way driving the drum 2.

A novel drive is established and the drive to the drum is impositive in action and its magnitude is limited by the limiting device so that the speed of rotation of the drum substantially corresponds to the ground speed of the harvester unit. In case of chokage or stoppage of the drum for any reason, the operation of the member 46 in its orbiting about the shaft 18 in no way imposes any driving loads as would cause damage to the bars, etc.

Figure 5:
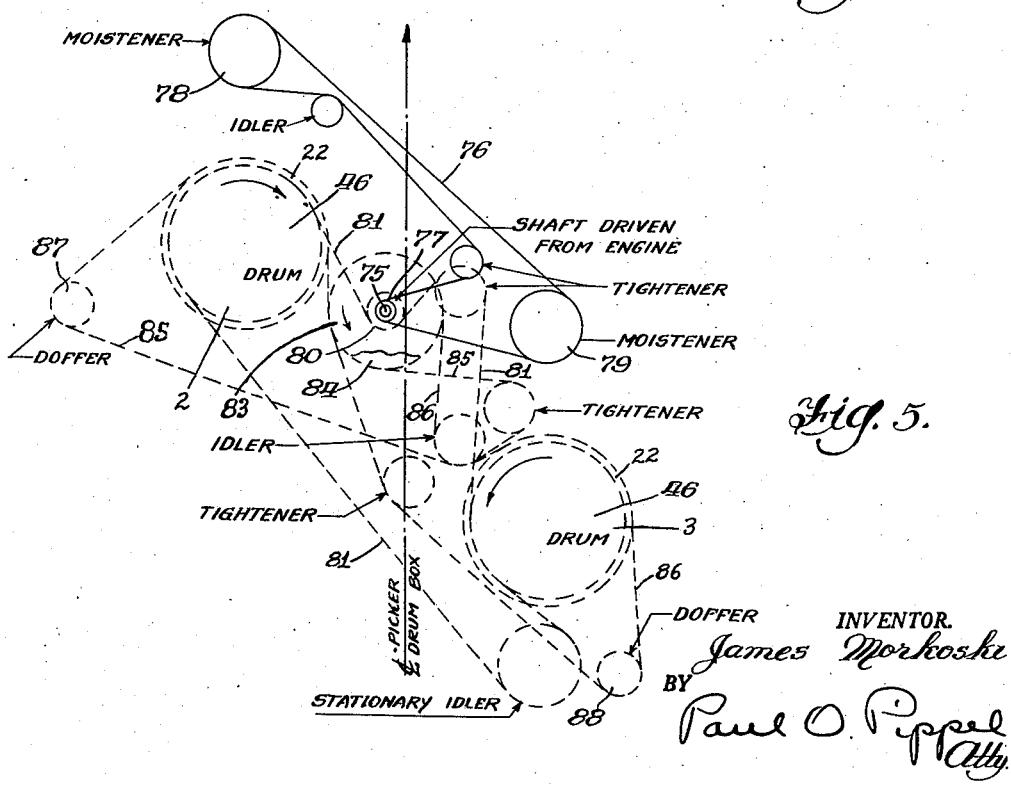
Figure 5 is a plan diagrammatic view showing the driving arrangement for the various parts of the cotton picker.

In Figure 5 there is shown a schematic drive with the various parts labeled. It will be noted that the shaft 75 is driven from the engine of an associated tractor as explained in the beforementioned patent and drives a first chain 76 through a sprocket 77 for driving the moisteners 78 and 79.

The shaft 75 carries a second sprocket 80 driving a timing chain 81 which drives the sprockets 46 of the speed limiters 45 of the respective drum units 2 and 3.

The shaft 75 further carries sprockets 83 and 84 which drive chains 85 and 86 which in turn drive the sprockets 22 of the respective drums 2 and 3 and also the doffers 87 and 88 and all of the aforesaid constituting part of the transmission.

It will be understood that it may occur in certain installations where the parts are extremely loose and the lubrication is so good that insufficient friction is developed so that the rotor speed lags behind the ground speed. Under these circumstances and within the scope of the present invention the springs actuating the dogs or pawls would be under such tension to create a drag of the pawls over the teeth of the ratchet to provide an impositive drive to the drive through the synchronizing means 45.

It will be also appreciated that upon the rotor drive stopping that the pawls will click over the ratchet teeth and therefore give the operator an audible signal that the drum is choked.

What is claimed is:

1. In a cotton picker of the type having an ambulatory structure including a carrier for moving along a plant row and a rotor rotatably carried on an upright axis by the carrier in a position disposing one area thereof alongside said row, said rotor including axially extending structure and vertical rows of outwardly extending spindles rotatably mounted on said structure for rotating about their individual axes, the improvement comprising common drive means for rotating said rotor in toto about said axis and for rotating said spindles about their individual axes, said drive means including a vertical shaft drivingly geared with each row of spindles and each having an input gear connected thereto, a power driven driving gear rotatable about said axis and in driving engagement with the input gears of said shafts for rotating each shaft about its individual axis and for orbiting all of said shafts with said rotor about said axis of rotation of the rotor in a direction advancing rearwardly said area of the rotor along said row, and mechanism for limiting the peripheral speed of rotation of said rotor to substantially the speed of ground travel of said carrier and comprising a driven member rotatable about the axis of rotation of the rotor and moving in said direction of rotation of said rotor, and means connected to said axis in the path of said member and abuttable with said member when said rotor rotates at a peripheral speed beyond ground traverse speed of said carrier.

2. For use in a cotton picker of the type including an ambulant carrier adapted to travel along a row of cotton plants and a rotor rotatably supported on a vertical axis with one area along said row and at that area moving in a rearward direction and said rotor including a plurality of upright bars disposed about said axis, and support means connected to said bars for holding them in said relationship and a plurality of outwardly extending spindles journalled on each bar for rotation about their individual axes, means for bodily rotating said rotor in said direction and for rotating said spindles about their individual axes comprising an upright shaft rotatably mounted in each bar, gear means on each spindle and shaft drivingly interconnecting the same, each shaft having an upper end with a pinion gear connected thereto, a power driven sun gear rotatably supported about the axis of rotation of said rotor and in meshing engagement with all of said pinion gears, the improvement comprising a power driven member rotatably mounted upon said shaft and rotatable in the same direction as said rotor and interengaging means on said shaft and said member engageable with each other when said rotor tends to rotate at a speed faster than that of said member for limiting the speed of the rotor to that of said member.

3. In a cotton picker of the type having an ambulatory carrier for moving along a row of cotton plants and a picker unit mounted upon the carrier and including a housing and an upright rotor therein rotatable about a vertical axis and having one area adapted to be positioned along said plant row and at that area moving rearwardly, said rotor including a plurality of substantially vertical bars disposed about said axis and means mounting said bars from said housing for orbiting about said axis, a plurality of outwardly extending spindles journalled on each bar, a drive shaft in each bar, gear means on each shaft and spindle drivingly associated with each other, a pinion connected to each shaft and a master gear meshing with said pinions and carried by said mounting means for rotation about said axis in said direction of rotation of the rotor, the improvement comprising: means for limiting the rotation of said rotor so that its peripheral speed is substantially equal to the ground speed of the carrier and comprising a one-way drive mechanism including a rotary driven element having abutment means and a driving element disposed in driven relation by the rotor and engageable with said abutment means when said rotor tends to overrun said driven element and disengage from said abutment means when the rotor stops or its speed of rotation lags behind the speed of said driven element.

4. In a cotton picker of the type comprising a support and a rotor rotatably supported thereon with an area along a selected plant row and said rotor including a plurality of vertical bars and means mounting said bars about the periphery of said rotor and each bar journaling a plurality of outwardly extending spindles having inner ends with gear means thereon and an axial shaft journalled in each bar and having gear means meshing with the gear means of respective spindles and a pinion on each shaft, and a driving sun gear meshing with the pinions on said shafts, the improvement comprising: means for synchronizing the speed of the rotor to substantially the ground speed of the cotton picker and including a first part operatively connected to said rotor and driven thereby, and a second part cooperatively associated with said first part, means for driving said second part at a speed corresponding to ground speed, and cooperatively associated inter-engaging means on said parts engageable when said rotor tends to overrun said ground speed and disengageable when said rotor stops or runs below said ground speed.

5. The invention according to claim 4 and a slip connection between said parts whereby said second part impositively assists in driving said rotor through said first part.

6. In a cotton harvester, a picker unit comprising cotton picking members and a support therefor constrained for movement with said unit including a part rotatable therewith about a given axis, a power driven transmission drivingly associated with said unit and tending to drive said unit and part in excess of a maximum speed about said axis, a control assembly for limiting the speed of said unit to said maximum speed and including a speed regulated control element, and an element drivingly connected to said part and reactively cooperative with said control element to limit rotation of said part with said unit to said maximum speed in response to said part and unit tending to exceed said maximum speed, and said transmission including means providing an impositive driving connection to said unit whereby said unit is adapted to stop while power is being delivered thereto.

7. The invention according to claim 6 and further characterized in that said control element is rotatable about said axis in the direction of rotation of said rotatable part and said elements comprise abutments engageable when said part with said unit tends to overrun said control element.

8. The combination of a support, a cotton picker drum having a vertical shaft element journalled on the support and a plurality of peripheral vertical bars, a shaft member journalled in each bar, a pinion connected to each shaft member, a plurality of outwardly extending spindles rotatably supported on each bar, gear means drivingly interconnecting each shaft member and associated spindles, a master gear mounted on said shaft element and meshing with the pinions, power means operatively associated with said master gear for driving it in one direction, a toothed ratchet member operatively connected to said vertical shaft element and driven thereby, a control element driven at controlled speed in the same direction as the master gear and cooperatively associated with said ratchet wheel, and spring pressed pawls carried on said control element for engagement by the teeth of said ratchet wheel as said drum tends to rotate at a speed in excess of the speed of said control element and to escape over the teeth when said element rotates faster than the drum.

References Cited in the file of this patent
UNITED STATES PATENTS

| | | |
|---|---|---|
| 2,140,631 | Johnston | Dec. 20, 1938 |
| 2,595,601 | Paradise | May 6, 1952 |
| 2,723,520 | Hubbard | Nov. 15, 1955 |